United States Patent [19]

Robinson

[11] 4,285,553

[45] Aug. 25, 1981

[54] MAGNETIC SUSPENSION MOMENTUM DEVICE

[75] Inventor: Alan A. Robinson, Wassenaar, Netherlands

[73] Assignee: Organisation Europeenne de Recherches Spatiales, France

[21] Appl. No.: 35,409

[22] Filed: May 2, 1979

[30] Foreign Application Priority Data

May 22, 1978 [BE] Belgium .................................. 187909
Mar. 27, 1979 [BE] Belgium .................................. 194243

[51] Int. Cl.³ .......................................... F16C 39/06
[52] U.S. Cl. ................................................ 308/10
[58] Field of Search .......................... 308/10; 244/166; 73/518, 519

[56] References Cited

U.S. PATENT DOCUMENTS

| 3,845,995 | 11/1974 | Wehde | 308/10 |
| 4,043,614 | 8/1977 | Lyman | 308/10 |
| 4,077,678 | 3/1978 | Studer | 308/10 |
| 4,114,960 | 9/1978 | Haberman | 308/10 |
| 4,156,548 | 5/1979 | Anderson | 308/10 |

Primary Examiner—R. Skudy
Attorney, Agent, or Firm—Hill, Van Santen, Steadman, Chiara & Simpson

[57] ABSTRACT

A magnetic suspension device comprising an annular stator surrounded by a coaxial annular rotor with an annular gap therebetween. The rotor comprises an axial ring-like permanent magnet for creating the suspension magnetic field. The stator comprises a ring-like U-shaped section of a magnetic material with an axial ring portion and a pair of parallel radial annular portions, the axial ring portion including segmental coils for producing positioning control magnetic fluxes for radial positioning of the rotor relative to the stator. The mode of construction of the stator considerably facilitates the fabrication and assembly of the device and provides a more efficient operation than the known devices.

6 Claims, 5 Drawing Figures

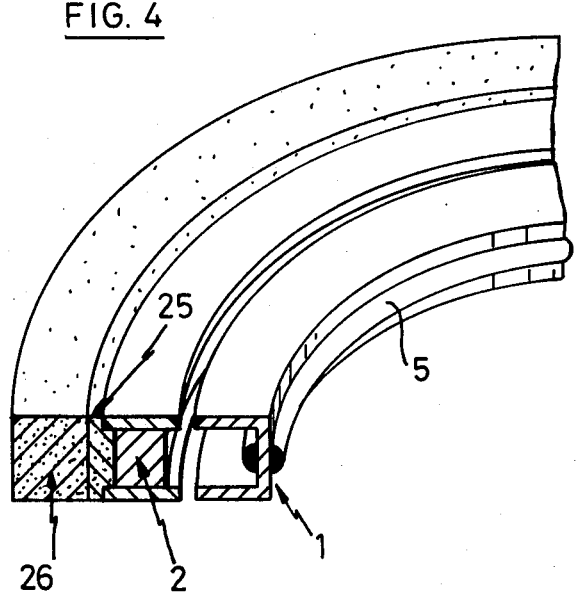
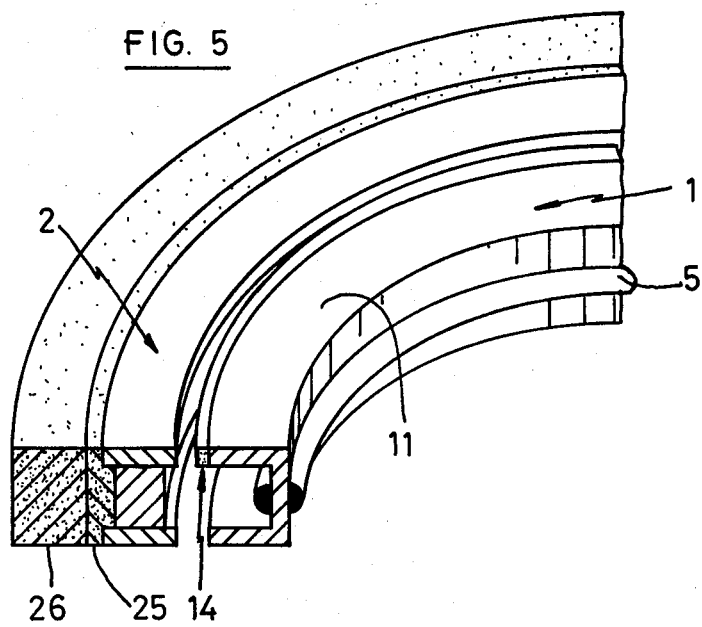

MAGNETIC SUSPENSION MOMENTUM DEVICE

BACKGROUND OF THE INVENTION

The present invention relates to a light-weight magnetic suspension momentum device which is easy to manufacture.

In space applications there is a need for momentum devices which are as light and reliable as possible consistent with acceptable performances and also it is desirable to have devices with as simple a design as possible.

Generally the momentum devices have a stator member which is fixed to the spacecraft and a rotor member which provides the required momentum when it rotates at a nominal speed relative to the stator members. An advantageous type of momentum device is that one having a contactless magnetic bearing system for supporting the rotor member. The known devices in this category are generally mechanically complex with significant mass for the stator member.

An improved design is a two-degree of freedom active bearing device as disclosed in U.S. Pat. No. 4,000,929. This device comprises a stator member in the form of a disc and an annular rotor member situated in the same plane as the disc and separated therefrom by a radial airgap in which a radial magnetic field is produced for supporting the rotor member. This suspension magnetic field is produced by a permanent magnet centrally located on the stator disc. When the disc has a small thickness and four curved polar faces confronting the inner face of the annular rotor and when the latter rotates at high speed relative to the stator, the magnetic flux in the airgap reverses at 90 degree angular intervals in the rotation plane, which causes high eddy current losses to occur whereby the free rotation of the rotor is prevented. This drawback is overcome when the stator member consists of a double disc such that its polar faces are displaced in the axial direction and are substantially aligned in parallel planes thereby to reduce the magnetic flux path through the annular rotor. Such an embodiment, however, is disadvantageous in practice as it reduces the rotor mass at the expense of increased stator mass.

Now, on a spacecraft it is very important to reduce the stator mass as low as possible so as to enable the device to have a higher payload capability. Also, the permanent magnet centrally located on the stator has a relatively small volume which leads to a poor transverse stiffness capability when this device is used as a momentum device. If in this device the volume of the permanent magnet is increased in order to obtain an acceptable transverse stiffness, the stator mass is also substantially and harmfully increased. In this respect too, the device disclosed in the U.S. patent referred to above is inadequate, since the transverse stiffness is of prime importance for momentum wheel applications and especially for systems operating at high speeds and having high momentum values.

The U.S. Pat. No. 4,043,614 discloses another device of the same type as described above. The stator and rotor members comprise an annular permanent magnet on the opposed faces of which are fixed two parallel thin polar rings of a magnetic permeable material. The polar rings on the stator and rotor members extend in two parallel planes. The polar rings on the stator member have cut-outs to accomodate sectoral electrical coils for creating a magnetic induction in the adjacent magnetic permeable rings on the rotor member.

A major drawback in this embodiment is that the stator member does not have any magnetic permeable path between the polar rings carrying the coils, which limits the magnetic suspension rigidity. Furthermore, the problem with this embodiment resides in that the coils on the stator are difficult to fabricate and to assemble. Also, the presence of the cut-outs in the polar rings for accomodating the coils renders these polar rings insufficiently rigid and consequently, to render these polar rings sufficiently stiff, it is necessary to provide the stator with sufficient stiffener means which increase the stator mass. In addition, the presence of the cut-outs causes non negligible eddy current to produce rotation losses.

SUMMARY OF THE INVENTION

The problems as explained above are solved with the invention which provides improvements in the magnetic suspension device having contactless coaxial annular stator and rotor members.

In accordance with this invention, the rotor member only comprises an axial ring-like permanent magnet to create a suspension magnetic flux for assuring the axial alignment with the stator member and the latter has a substantially U-shaped section with an axial ring portion extending parallel to the common axis of the stator and rotor members and a pair of parallel radial annular flanges extending perpendicular to said common axis. The segmental coils for producing the control fluxes are carried by said axial ring portion of the stator member.

In an advantageous embodiment the rotor member comprises an outer ring of a non magnetic material; this outer ring in turn can bear externally a second ring of a magnetic material.

The advantages of the improved device of this invention are summarized hereafter:

(a) great simplification of the fabrication and assembly of the stator coils, (b) reduction of the stator mass due to a slight reduction of the mean radius of the parts of the coils not enclosed in the U-section and due to the fact that the parallel flanges of the stator section which no longer have cut-outs, are stiffer and hence do not require additional stiffener means, (c) reduction of the rotation losses due to the fact that the gap faces of the stator section are continuous, (d) significant reduction of the magnetic dipole moment of the whole device (magnetic alignment effect with the earth's magnetic field) due to the fact that the short circuiting effect of the non-useful part of the permanent magnet flux, (e) appreciable reduction of the reluctance of the magnetic path traversed by the stator coil fluxes, resulting in a significant reduction of power consumption, (f) possibility to realize an annular hermetic casing having a higher rigidity than the usual cylindrical casings, which results in a further reduction in the overall mass of the device, (g) possibility, without increase of the stator mass, to realize a larger suspension surface due to the annular configuration of the stator member.

DESCRIPTION OF THE DRAWINGS

FIG. 4 is a partial view showing a variation of the embodiment of FIG. 1;

FIG. 5 is a partial view showing another variation of the embodiment of FIG. 1.

DESCRIPTION OF AN EMBODIMENT

Figure 1:
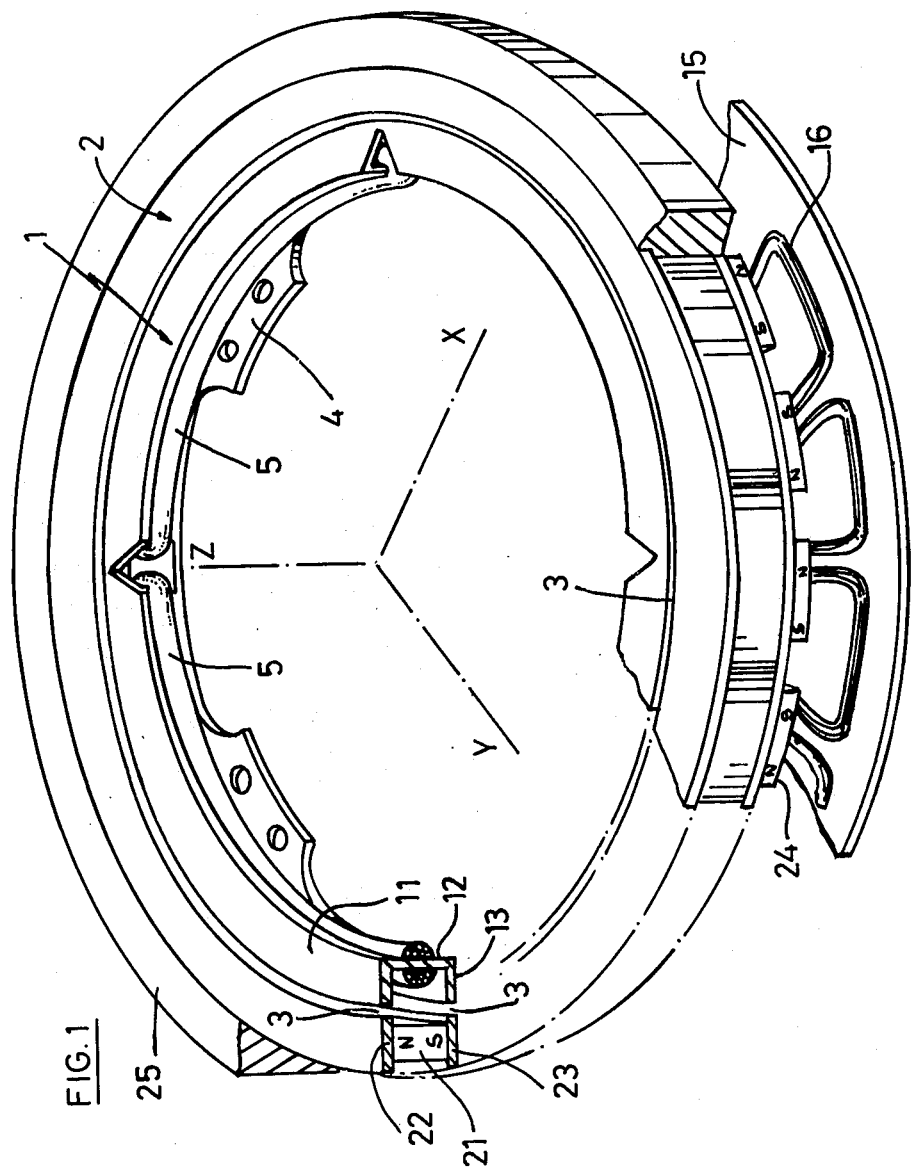
FIG. 1 is a perspective view of an embodiment of the invention.

Referring to FIG. 1, the structure according to the invention essentially comprises an annular stator member 1 to be fixed to the spacecraft and an outer annular rotor member 2 separated from each other by an annular gap 3. The stator member 1 and the rotor member 2 are free of mechanical contact with each other. They extend coaxially with their common axis designated as Z and they are arranged for being maintained in a same plane X—Y perpendicular to the Z-axis. The stator member 1 is provided with attachment lugs 4 for attachment to the spacecraft.

The stator member 1 consists of a ferrous ring having a U-shaped cross-section with an axial ring-like web 12 and with two parallel radial annular flanges 11, 13. On the axial ring-like web 12 are wound four segmental electrical coils 5 serving, in a manner known per se, to control the radial position of the rotor member 2 relative to the stator member 1 along the X and Y-axes. For that purpose, the coils 5 are connected, in a manner known per se, in two control loops associated with an electronic apparatus (not shown) to derive signals from the X and Y-axis coils to produce appropriate error signals, or the error signals may be derived by other classical non contacting position sensor devices.

Figure 2:
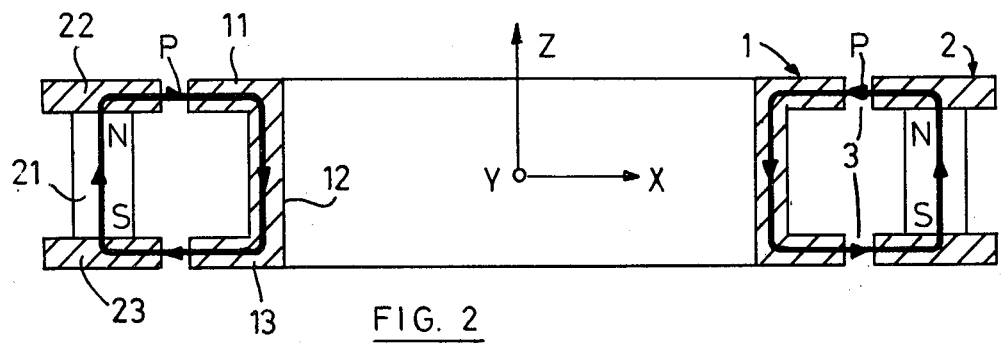
FIG. 2 is schematic section illustrating the path of the suspension magnetic flux.

The rotor member 2 consists of an axial ring-like permanent magnet 21 sandwiched between a pair of radial annular pole pieces 22, 23. The magnet 21 is polarized axially. The pole pieces 22, 23 extend respectively in the planes of the radial flanges 11, 13 of the stator member 1. The permanent magnet 21 sets up concentrated radial suspension magnetic fluxes in the annular gaps 3 between the stator flanges 11, 13 and the rotor pole pieces 22, 23 as shown in FIG. 2. These magnetic fluxes P create in the gaps 3 attraction forces which ensure axial alignment of the rotor member 2 with the stator member 1, the rotor pole pieces 22, 23 tending to align with the stator flanges 11, 13 such that a magnetic path is established having a maximum permeability. The rotor is thereby passively and magnetically positioned with respect to the stator 1 in three degrees of freedom, i.e. translation along the Z-axis, rotation about the X-axis and rotation about the Y-axis. Any of these motions would result in a relative displacement of the rotor and the stator planes. The radial position of the rotor member with respect to the stator member is controlled by the magnetic fluxes R produced by the coils 5 which are wound on the stator web 12 in such a way that the coil axes always lie along the X and Y-axes.

Figure 3:
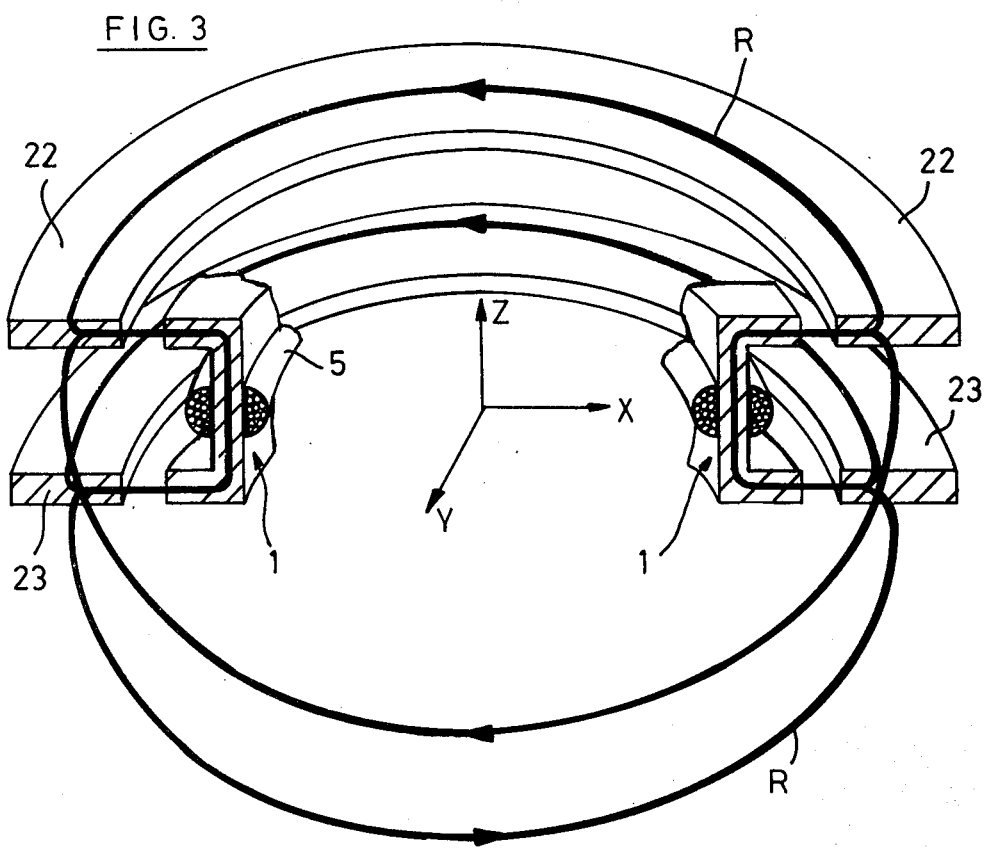
FIG. 3 is a partial view illustrating the path of the control magnetic fluxes for one axis in the plane of the device.

Referring to FIG. 3, let us consider for instance the position control along the X-axis. The coils along each axis are wound so as to generate a magnetic flux in the same direction along the respective axis. FIG. 3 illustrates the path of the control fluxes generated when the X-coils are energized by a current in one direction. When comparing the FIGS. 2 and 3, it can be seen that the control fluxes R aid the suspension permanent flux P in the gaps 3 on the left hand side of the drawing and that they oppose the suspension permanent flux P in the gaps 3 on the right hand side of the drawing. It results in this example a net force on the rotor member 2 in the +X direction. For the opposite direction of current in the coils, a resultant net force in the −X direction would be produced. A similar mechanism is produced when the Y-coils are energized.

It will be noticed that the control fluxes circulate circumferentially in the rotor pole pieces 22 and 23 without traversing the axial ring-like permanent magnet 21 (not shown in FIG. 3 but visible on FIG. 2). This feature enables the required radial positioning forces to be produced with relatively small coils, since the magneto-motive forces of said coils have not to overcome the usually high reluctance of the permanent magnet.

The rotor 2 carries on its periphery an outer ring 25 of non magnetic material for serving to adjust the rotor mass to the desired value. This ring 25 can also serve to maintain within acceptable limits the centrifugal forces in the ferrous portions of the rotor member.

In a variation illustrated in FIG. 4, the outer ring 25 is surrounded by a second ring 26 of magnetic material in order to provide a low reluctance path for the magnetic fluxes generated by the coils 5, which assists in reducing the reluctance and, consequently, the power consumption.

In another variation illustrated in FIG. 5, the stator member has on the outer circular face of one of its radial flanges, in this example the flange 11, an outer ring 14 of non magnetic material having a width smaller than the width of the gap 3. This ring 14 prevents the closure of the gap when the magnetic suspension system is not in operation.

In order to rotate the rotor 2 about the Z-axis, the lower pole piece 23 of the rotor has a plurality of flat permanent magnets 24 distributed along it, said magnets being arranged with alternating magnetic polarities to form the poles of a driving motor for the rotor. A set of coils 16 are wound on a flat ring 15 of conductive material attached to the stator in close relation with the flat magnets 24.

The device additionally comprises any known contactless sensor means, e.g. an electro-optical system, for detecting the angular position of the motor field assembly for motor commutation purposes.

What is claimed is:

1. A magnetic suspension momentum device comprising an annular stator member and an outer annular rotor member coaxial with the stator member, said rotor member surrounding the stator member without mechanical contact with the latter and with an annular gap therebetween;

said rotor member comprising a pair of parallel radial annular pole pieces, an axial ring-like permanent magnet therebetween with said permanent magnet being polarized axially, an outer ring of a non-magnetic material fixed on the periphery of said rotor member, said outer ring being surrounded by a second ring of a magnetic material, said stator member comprising a ring-like U-shaped section of a magnetic material with an axial ring portion and a pair of parallel radial annular portions extending outwardly respectively in the same planes as the annular pole pieces of the rotor member with radial annular gaps therebetween, said axial ring portion including segmental coils for producing, when traversed by an electric current, magnetic fluxes across said radial annular gaps to circulate circumferentially along the annular pole pieces of the rotor member.

2. A device according to claim 1, wherein the stator member comprises an outer ring of a non-magnetic material fixed on the outer circular face of at least one of its radial annular portions, the radial width of said outer ring being smaller than the gap width between stator and rotor.

3. A device according to claim 1, wherein one of said annular pole pieces of the rotor member has a plurality of flat permanent magnets distributed along it, said permanent magnets being arranged with alternating magnetic polarities to form the poles of a driving motor for the rotor member, and wherein the stator member comprises a flat ring of a non-conductive material, said flat ring carrying electric coils for producing the motor magnetic field.

4. A magnetic suspension momentum device comprising an annular stator member and an outer annular rotor member surrounding the stator member without mechanical contact with the latter and with an annular gap therebetween;

said rotor member comprising a pair of parallel radial annular pole pieces and an axial ring-like permanent magnet therebetween, said permanent magnet being polarized axially;

said stator member comprising a ring-like U-shaped section of a magnetic material with an axial ring portion, a pair of parallel radial annular portions extending outwardly respectively in the same planes as the annular pole pieces of the rotor member with radial annular gaps therebetween and an outer ring of a non-magnetic material fixed on the outer circular face of at least one of its radial annular portions, the radial width of said outer ring being smaller than the gap width between stator and rotor, said axial ring portion including segmental coils for producing, when traversed by an electric current, magnetic fluxes across said radial annular gaps to circulate circumferentially along the annular pole pieces of the rotor member.

5. A device according to claim 4, wherein one of said annular pole pieces of the rotor members has a plurality of flat permanent magnets distributed along it, said permanent magnets being arranged with alternating magnetic polarities to form the poles of a driving motor for the rotor member, and wherein the stator member comprises a flat ring of a non-conductive material, said flat ring carrying electric coils for producing the motor magnetic field.

6. A magnetic suspension momentum device comprising an annular stator member and an outer annular rotor member coaxial with the stator member, said rotor member surrounding the stator member without mechanical contact with the latter and with an annular gap therebetween;

said rotor member comprising a pair of parallel radial annular pole pieces and an axial ring-like permanent magnet therebetween, said permanent magnet being polarized axially, one of said annular pole pieces of the rotor member having a plurality of flat permanent magnets distributed along it, said permanent magnets being arranged with alternating magnetic polarities to form the poles of a driving motor for the rotor member, and said stator member comprising a ring-like U-shaped section of a magnetic material with an axial ring portion, a pair of parallel radial annular portions extending outwardly respectively in the same planes as the annular pole pieces of the rotor member with radial annular gaps therebetween, and a flat ring of a non-conductive material, said axial ring portion including segmental coils for producing, when traversed by an electric current, magnetic fluxes across said radial annular gaps to circulate circumferentially along the annular pole pieces of the rotor member.

* * * * *